(12) United States Patent
Tranquilli, Jr. et al.

(10) Patent No.: US 9,936,421 B2
(45) Date of Patent: Apr. 3, 2018

(54) FREQUENCY WATERFILLING VIA IMPLICIT COORDINATION

(71) Applicant: BAE Systems Information and Electronic Systems Integration Inc., Nashua, NH (US)

(72) Inventors: John A. Tranquilli, Jr., Amherst, NH (US); Sean F. Mason, Philadelphia, PA (US); Amber L. Dolan, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 214 days.

(21) Appl. No.: 15/141,887

(22) Filed: Apr. 29, 2016

(65) Prior Publication Data

US 2017/0318497 A1    Nov. 2, 2017

(51) Int. Cl.

| H04B 15/00  | (2006.01) |
|---|---|
| H04W 28/08  | (2009.01) |
| H04J 3/16   | (2006.01) |
| H04W 28/04  | (2009.01) |
| H04L 12/935 | (2013.01) |
| H04W 24/04  | (2009.01) |
| H04W 12/12  | (2009.01) |
| H04B 1/715  | (2011.01) |

(52) U.S. Cl.
CPC ........... *H04W 28/08* (2013.01); *H04J 3/1694* (2013.01); *H04L 49/3081* (2013.01); *H04W 12/12* (2013.01); *H04W 24/04* (2013.01); *H04W 28/048* (2013.01); *H04B 2001/7152* (2013.01)

(58) Field of Classification Search
CPC ..... H04W 28/08; H04W 12/12; H04W 24/04; H04W 28/048; H04J 3/1694; H04L 49/3081; H04B 15/00
See application file for complete search history.

(56) References Cited

U.S. PATENT DOCUMENTS

| 3,648,287 | A  | 3/1972  | Lind |
| 3,949,309 | A  | 4/1976  | Pecar |
| 5,321,405 | A  | 6/1994  | Luck |
| 8,350,745 | B2 | 1/2013  | Kasperkovitz et al. |
| 8,350,746 | B2 | 1/2013  | Kasperkovitz |
| 8,649,463 | B2 | 2/2014  | Nakano et al. |
| 8,880,016 | B2 | 11/2014 | Kasperkovitz |

(Continued)

FOREIGN PATENT DOCUMENTS

CN        104253779 A    12/2014

OTHER PUBLICATIONS

International Search Report, PCT/US2017/030103, dated Aug. 4, 2017, 13 pages.

*Primary Examiner* — Ricky Ngo
*Assistant Examiner* — Lan Huong Truong
(74) *Attorney, Agent, or Firm* — Davis & Bujold, PLLC

(57) ABSTRACT

The system and method of utilizing frequency waterfilling and implicit coordination to mitigate signal jamming in Link 16 systems. The system and method of utilizing frequency waterfilling for Link 16 includes updates to both software and firmware. The frequency waterfilling approach for Link 16 modifies the process by which data bits are allocated to hops based on an assessment of hops affected by jamming, thus avoiding portions of the spectrum occupied by a jammer.

17 Claims, 6 Drawing Sheets

(56) References Cited

U.S. PATENT DOCUMENTS

| | | | |
|---|---|---|---|
| 9,094,114 B1* | 7/2015 | Hou | H04L 12/6418 |
| 2002/0197978 A1* | 12/2002 | Zavidniak | H04L 63/1416 |
| | | | 455/410 |
| 2009/0103720 A1* | 4/2009 | Karayil Thekkoott Narayanan | H01Q 9/0407 |
| | | | 380/34 |
| 2017/0187442 A1* | 6/2017 | Luddy | H04B 7/0632 |

\* cited by examiner

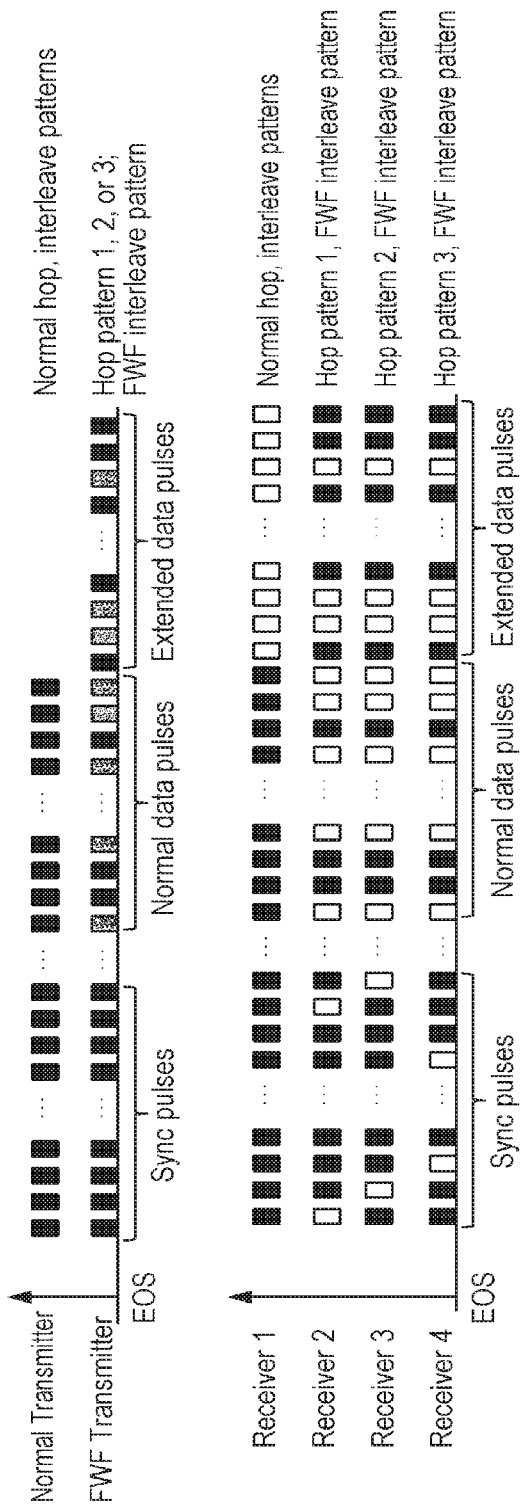
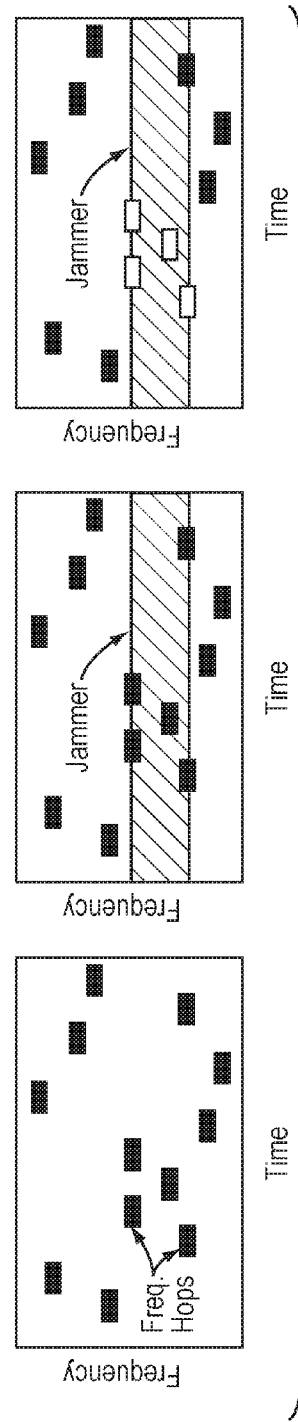
FIG. 2A
FIG. 2B

FREQUENCY WATERFILLING VIA IMPLICIT COORDINATION

STATEMENT OF GOVERNMENT INTEREST

This disclosure was made with U.S. Government support under Contract No. FA8750-11-C-0189 awarded by the U.S. Department of the Air Force. The U.S. Government has certain rights in this disclosure.

FIELD OF THE DISCLOSURE

The present disclosure relates to Link 16 communications and more particularly to utilizing frequency waterfilling ("FWF") and implicit coordination to mitigate signal jamming in Link 16 communications.

BACKGROUND OF THE DISCLOSURE

Link 16 is a military tactical data exchange network. Its specification is part of the family of Tactical Data Links. With Link 16, military aircraft as well as ships and ground forces may exchange tactical, information in near-real time. Link 16 also supports the exchange of text messages, imagery data, provides two channels of digital voice (e.g., 2.4 kbit/s and/or 16 kbit/s in any combination), precise position location and identification ("PPLI") navigation information, and radar tracking information.

Link 16 is a TDM A-based secure, jam-resistant, high-speed digital data link which operates in the radio frequency band of 960 to 1,215 MHz. This frequency range generally limits the exchange of information to users within line-of-sight of one another, but with the satellite capabilities and ad hoc protocols available now, Link 16 data can be passed over long-haul protocols such as TCP/IP using MIL-STD 3011 (JREAP), STANAG 5602 (SIMPLE), and the like. Link 16 uses transmission characteristics and protocols, conventions, and fixed-length or variable length message formate. Information is typically passed at one of three data rates: 31.6, 57.6, or 115.2 kilobits per second, although current radios and the waveform itself can support throughput values well over 1 Mbit/s. Operational use of Link 16 includes surveillance, early warning, mission management, weapons coordination, air control, fighter-to-fighter, secure voice, navigation, and position identification.

It is well understood that signal jamming is a significant problem with any communication system, hut that signal jamming in a tactical situation can not only be detrimental to a mission but can also jeopardize the health and safety of personnel.

SUMMARY OF THE DISCLOSURE

It has been recognised that there is a need to avoid interference energy in communications systems. The present disclosure addresses this need particularly for Link 16 communications and more particularly by utilizing frequency waterfiliing ("FWF") and implicit coordination to mitigate signal jamming. This system and method utilizes frequency waterfilling for Link 16 including updates to both software and firmware. The frequency waterfilling approach for Link 16 described herein modifies the process by which data bits are allocated to hops based on an assessment of hops affected by jamming, thus avoiding portions of the spectrum occupied by a jammer.

One aspect of the present disclosure is a method of mitigating signal jamming in a Link 16 communication system, comprising identifying a plurality of transmitting nodes configured to transmit on a Link 16 band divided into three equal sub-bands, thus transmitting signal via four possible FWF schemes; identifying a plurality of receiving nodes; detecting jamming energy; decoding signals from a first transmitting node at a first receiving node to determine the amount of data in a signal that overlaps with jamming energy; determining at the first receiving node whether a Frequency Waterfilling (FWF) scheme request is being transmitted by the first transmitting node; selecting at the first receiving node the FWF scheme requested from the first transmitting node; and transmitting a signal at a second transmitting node using the selected FWF scheme requested by the first transmitting node.

One embodiment of the method is wherein selecting a FWF scheme further comprises quantifying the number of requests for each kind of FWF scheme detected by the first receiving node.

One embodiment of the method is wherein selecting a FWF scheme further comprises assessing the signal to noise ratio for each signal transmitted by the first transmitting node.

One embodiment of the method further comprises error correction decoding after a FWF scheme is determined.

One embodiment of the method farther comprises correlating the four possible FWF schemes from sync pulses to data symbols.

One embodiment of the method further comprises de-interleaving the data symbols.

One embodiment of the method is wherein selecting a FWF scheme further comprises determining which FWF scheme results in proper alignment of data after interleaving.

One embodiment of the method is wherein transmitting using a selected FWF scheme comprises transmitting "dummy" pulses on hops that are within, the sub-band that is to be avoided.

Another aspect of the present disclosure is a non-transitory computer-readable medium tangibly embodying a computer program comprising instructions operable to cause data, processing apparatus to perform operations comprising: identifying a plurality of transmitting nodes configured to transmit on a Link 16 band divided into three equal sub-bands, thus transmitting signals via four possible FWF schemes; identifying a plurality of receiving nodes; detecting jamming energy; decoding signals from a first transmitting node at a first receiving node to determine the amount of data in a signal, that overlaps with jamming energy; determining at the first, receiving node whether a Frequency Waterfilling (FWF) scheme request is being transmitted by the first transmitting node; selecting at the first receiving node the FWF scheme requested from the first transmitting node; and transmitting a signal at a second transmitting node using the selected FWF scheme requested by the first transmitting node.

Another aspect of the present disclosure is an anti-jamming system for Link 16 utilizing frequency waterfilling comprising, a plurality of transmitters configured to transmit signals using four possible FWF schemes, wherein the transmitter comprises a modified data spreader to allocate bits to hop periods; a plurality of receivers comprising control logic and modified combination matrix, peak detector, data recorder, and message control modules; an interference recognizer module; a Frequency Water filling (FWF) pulse selection module; and an interface between the receivers and transmitters comprising modified message control and frequency re-mapping modules.

One embodiment of the system further comprises a time out logic module.

One embodiment of the system further comprises a conflict resolution module.

These aspects of die disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

FIG. 2A is an illustration of one embodiment of frequency waterfilling (FWF) of the present disclosure.

FIG. 2B shows a pictorial representation of avoidance of jamming frequencies using frequency waterfilling (FWF) of one embodiment of the present disclosure.

DETAILED DESCRIPTION OF THE DISCLOSURE

It is understood that there is a need to avoid interference energy in communications systems. This is particularly true for tactical communications systems. The present disclosure is directed to Link 16 communication systems, and more particularly, to utilizing frequency waterfilling ("FWF") and implicit coordination to mitigate signal jamming.

Though frequency re-mapping has been used in Link 16 communications, it was developed to support operation in areas where the spectrum allocation for Link 16 is different due to local spectrum rules. Frequency re-mapping does not mitigate jamming. Instead, frequency re-mapping requires a radio to predetermine which frequencies will be avoided. This is done on a pre-mission basis and this functionality is typically built into the radio. The technique of frequency re-mapping is set out in the DoD Link 16 regulation.

The technique of frequency waterfilling has been used in OFDM, orthogonal frequency division multiplexing. OFDM is a technology used to compress a large amount of data into a small amount of bandwidth. This is done by dividing a large amount of data into smaller chunks, then sending that data simultaneously over a number of frequencies. When using frequency waterfilling in the OFDM context, the purpose is to maximize the power budget by assessing the spectrum and filling it in a way that concentrates more power in cleaner regions of the spectrum, thus maximizing capacity. In OFDM frequency waterfilling there is no coordination required or performed since the spectrum is still fully occupied and OFDM receivers are inherently able to decode such transmissions. There is no reciprocation and no implicit coordination. OFDM is simply a method of transmitting among several frequencies at the same time.

This disclosure describes the use of a frequency waterfilling ("FWF") technique implemented on a Link 16 communication system. In one embodiment, the FWF technique fits into existing Link 16 software/firmware ("SW/FW") architecture. In certain embodiments, there are a set of modifications for software (SW) control of the FWF function implemented in firmware (FW). In certain embodiments, the firmware uses FPGA logic. In certain embodiments, there are a set of FWF requirements implemented in addition to the normal Link 16 processing requirements.

In one embodiment, information is shared between nodes. In one embodiment, control logic is used to effectively employ FWF in all anticipated interference scenarios where FWF may apply.

Figure 1A:
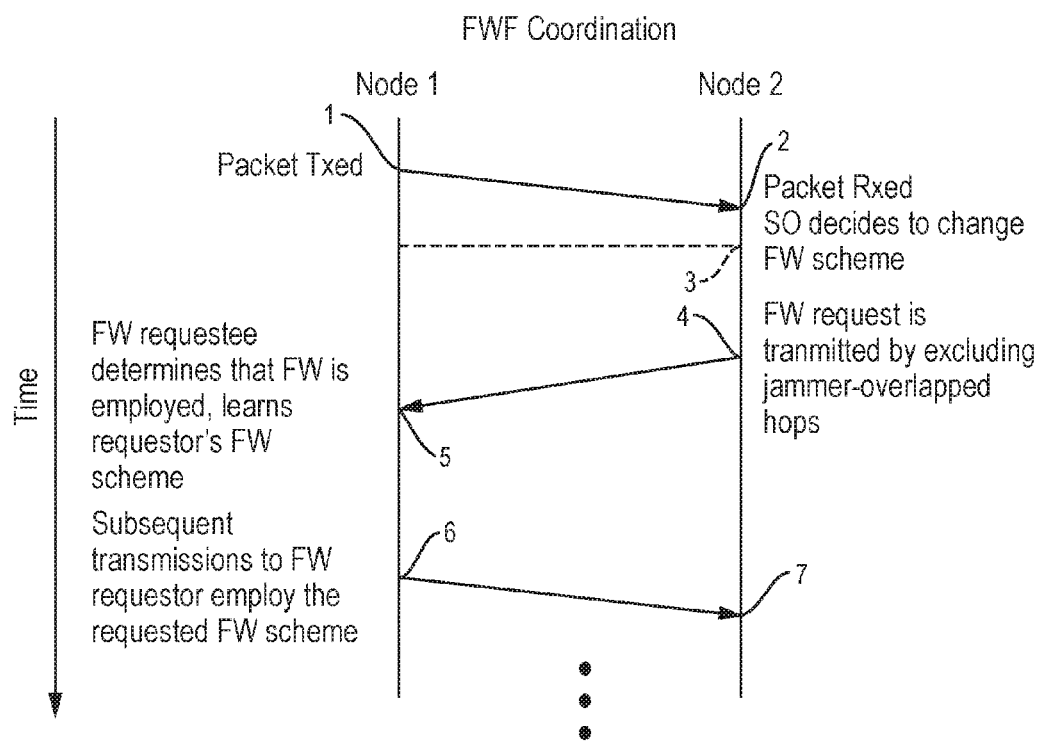
FIG. 1A shows one embodiment of the system of the present disclosure of frequency waterfilling (FWF) coordination within a Link 16 system where real data is not sent on jammer-overlapped hops.

Referring to FIG. 1A, one embodiment of frequency waterfilling (FWF) coordination in a Link 16 system is shown. In certain embodiments, receiving nodes determine which FWF schemes to transmit by decoding messages sent by transmitting nodes with all possible combinations of FWF sub-bands. Given the packet structure of Link 16, it is only possible for at most one of these schemes to decode properly. Selecting the scheme that enables the decoding to pass enables the receiving node to detect any FWF scheme transmitted by any other node. In certain embodiments, receiving nodes determine which FWF schemes to transmit by determining which of the messages makes the most sense with respect to a known parameter. In one embodiment, this conflict resolution is driven by deciding which FWF transmit scheme to use based on the quantity of requests of each available FWF scheme. In certain embodiments, the conflict is resolved by determining the signal to noise ratio (SNR) of each request for each possible FWF scheme.

In certain embodiments of the anti-jamming system of the present disclosure, FWF is implemented entirely in the FPGA. In one embodiment, the flag to turn the technique ON or OFF comes from control logic in software (e.g., a strategy optimizer=SO). In one embodiment, the Link 16 terminal that selects FWF for a mitigation technique transmits a longer length message containing "good" and "dummy" pulses. Here, the system transmits a longer length message where true data bits from the intended message are encoded on pulses that are not expected to overlap with jamming energy (i.e. "good" pulses), while "dummy" pulses, or irrelevant data, is transmitted on hops expected to overlap with jamming energy. In certain embodiments, the receiving Link 16 terminal decodes the message using the possible pre-arranged FWF schemes and determines the requested FWF scheme as the one that results in the most "good" pulses, or the scheme that results in the proper alignment of data after de-interleaving. In certain embodiments, this mitigation technique is partially backward compatible meaning that requesting or responding via FWF from a node does not prevent other nodes from continuing to send and receive standard Link 16 encoded messages.

Still referring to FIG. 1A, in certain embodiments, the receiving node decides to change the FWF scheme and transmits the request, by excluding jammer-overlapped hops. The FWF requestee then determines the FWF being used and determines the requestors scheme. In certain embodiments, the subsequent transmissions to the FWF requestor employ the requested FWF scheme.

Figure 1B:
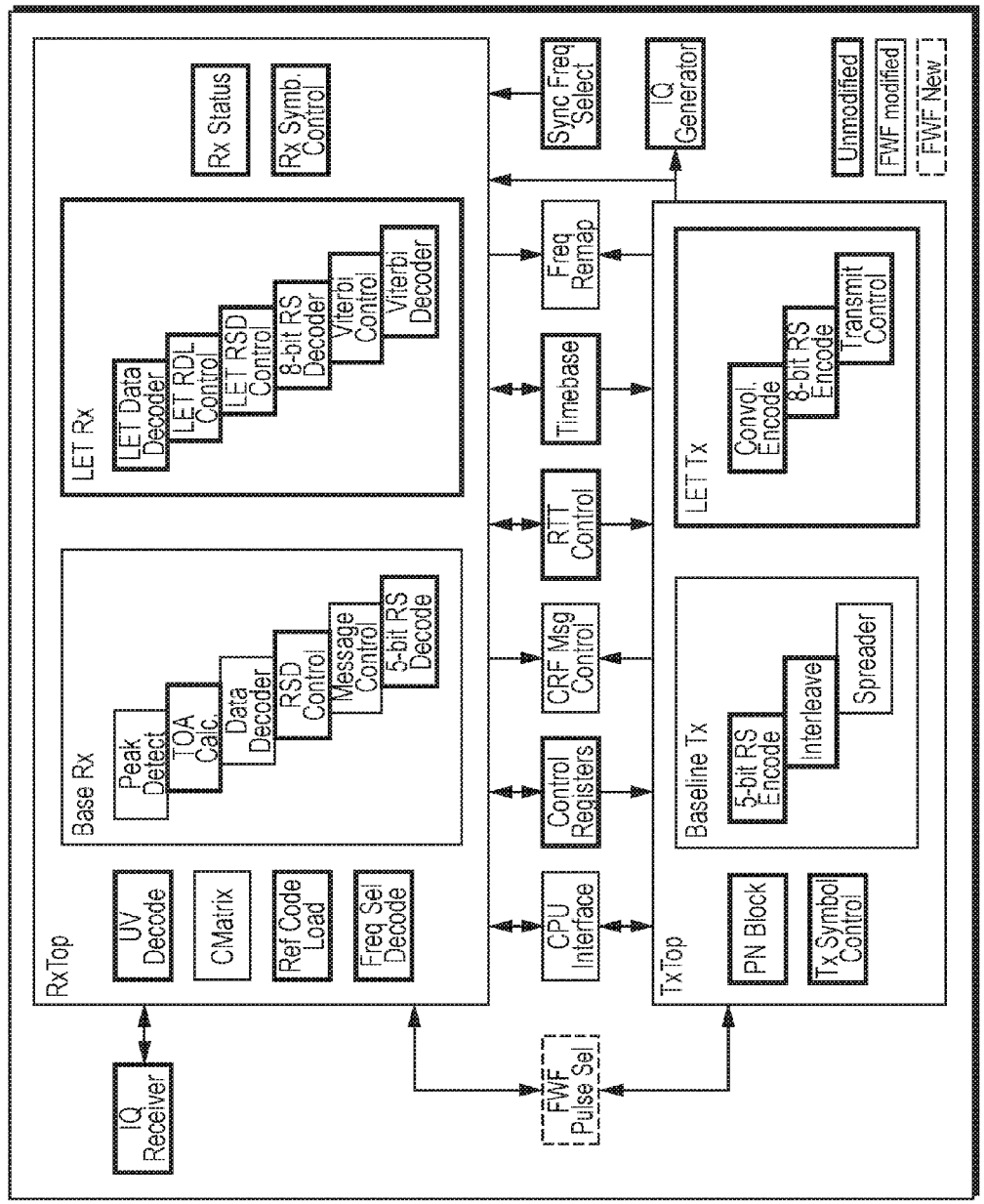
FIG. 1B shows one embodiment of the frequency waterfilling (FWF) algorithm architecture of the present disclosure within Link 16 firmware.

Referring to FIG. 1B, one embodiment of the frequency waterfilling (FWF) algorithm architecture within Link 16 firmware is shown. More specifically, Rx denotes receive data and Tx denotes transmit, data, and "LET" denotes Link 16 enhanced throughput. In certain embodiments, the "FWF Pulse Sel" module is newly added to implement FWF on Link 16. Here it is shown with a dashed border. In certain embodiments, several portions of Link 16 are modified for FWF. Here, they are shown in thinners borders. Within the Link 16 receiver top level module, the combination matrix, peak detector, data decoder, and message control components ail require modifications to process messages sent with different FWF schemes. Similarly, the interface between receiver and transmit modules must change to support sharing the local nodes FWF scheme information. The frequency remap function also needs modification as its desired frequency map has impacts on the reception process for FWF. In certain embodiments, on the transmit side, only the data spreader is modified as it is the component that allocates bits to particular hop periods.

The purpose of FWF as described herein is to avoid the worst (most jammed) third of the Link 16 frequency band without disclosing intentions to an adversary. In certain embodiments, the frequency band is from 960 MHz to 1215 MHz. In certain embodiments, the frequency band is from 969 MHz to 1206 MHz. In certain embodiments, the frequency band is split up into three segments of contiguous frequencies (sub-bands). In certain embodiments, FWF selects from tour possible FWF schemes to be used, hi certain embodiments, a Link 16 terminal can transmit normally (e.g., with all 3 sub-bands on), or with the assumption that 1 of the 3 possible sub-bands is jammed and is to be avoided.

Referring to FIG. 2A, an illustration of frequency waterfilling (FWF) of one embodiment of the present disclosure is shown. More specifically, in the top image a normal transmitter is compared to a transmitter utilizing FWF. There, all of the black bars are "good" data pulses on "good" channels, the dark gray bars represent "dummy" data on "bad" channels, and finally, the lighter gray bars represent "dummy" data on "good" channels. In certain embodiments, "dummy" pulses are interspersed among "good" pluses using a known pattern. In certain embodiments, the Interference Protection Feature ("IPF") histogram is preserved by putting 2/3 of the pulses on "good" frequencies (including all of the "good" data pulses and some "dummy" pulses).

Still referring to FIG. 2A, in the lower image a FWF-enabled receiver is shown processing data hops four different ways to implicitly determine the waterfilling scheme being used. There, the black pulses are processed, and the white pulses are ignored. Since the receiver processes incoming messages according to all possible FWF schemes, if a standard or FWF message is sent, the correct scheme will be decoded unless there is an impediment to signal reception other than interference in any avoided bands.

In certain embodiments, the same hop frequencies are used for all possible messages. When FWF is turned ON, the transmitting terminal changes standard messages to an extended length message format. The transmitter of the node selecting the FWF places "dummy" pulses on the hops that are within the sub-band that is to be avoided. In one embodiment, 258 of the 444 pulses need to be on the "good" sub-bands (or <186 pulses can be replaced with "dummy" pulses in the avoided sub-band) for FWF to work most effectively. In certain embodiments, if this constraint is not met, then the received FWF data is dropped at the receiver.

In certain embodiments when FWF is turned ON, the transmitting terminal also changes Round Trip-Time ("RTT") messages to a new message type implemented to allow for applying FWF on RTT. The RTT process has two types of messages and 'interrogation' message and a 'response' message. The new message types are extended length versions of these basic messages as described, below. Round-trip time (RTT), also called round-trip delay, is the time required for a signal pulse, or packet to travel from a specific source to a specific destination and back again. For example, the source may be a computer initiating a signal and the destination may be a remote computer or system that receives the signal and retransmits it. In one embodiment, of the present system, the message length is 124 pulses and the maximum number of pulses that can be replaced with "dummy" pulses for the RTT message is 52 pulses, meaning 72 of the 124 pulses need to be on the "good" sub-bands.

Referring to FIG. 2B, a pictorial representation of avoidance of jamming frequencies using frequency waterfilling (FWF) of one embodiment of the present disclosure is shown. More particularly, true message data bits are only transmitted on the hops that do not overlap with expected/detected jam energy. In certain embodiments, FWF is used to avoid narrowband and wideband signals spanning up to a third of the Link 16 band. For the purposes of this discussion, narrowband refers to anything within a single Link 16 hop bandwidth (e.g., 5 MHz) while wideband in this instance refers to up to a third of the Link 16 band (e.g., or up to about 51 MHz). In certain embodiments, the FWF system transmits an extended length message containing a normal length single or double pulse message (e.g., 3 or 6 RS blocks) and "dummy" pulses. In certain embodiments, the system avoids the worst third of the frequency band without disclosing intentions. In the figure, the rightmost frame shows 'whited out' hops for the overlapping hops. These hops are transmitted, but they do not have real data modulated onto them.

In certain embodiments for the anti-jamming system of the present disclosure, FWF could be implemented entirely in FPGA with only ON/OFF control required. In certain embodiments, the system is partially backward compatible. In certain embodiments, four data decoders (MLDs) may be run in the receiver. In certain embodiments, the system decodes the normal header first, and if that fails it will then try the FWF header. In certain embodiments, a receiver calculates tour preamble sums with adjusted thresholds and selects the one with the most "good" pulses. In this way, the sync detection process is adjusted to account for the fact that when transmitting with an FWF scheme because of interference over some of the band, the calculation of the sync threshold must be adjusted based on the expected number of frequencies in synchronization that will not be interfered with.

In certain embodiments of the FWF system, the Link 16 band is divided into three segments of contiguous frequencies. In certain embodiments, there are four possible hop patterns—normal (all frequencies are good), or band 1, 2, or 3 is bad. In certain embodiments, the same preamble code and frequencies are used for all messages. In certain embodiments, the transmitter and receiver use pre-arranged algorithms to place "dummy" pulses and to modify the hop patterns. In some embodiments, the system applies standard normal length interleave patterns or "modified" normal length FWF interleave patterns.

Figure 3:
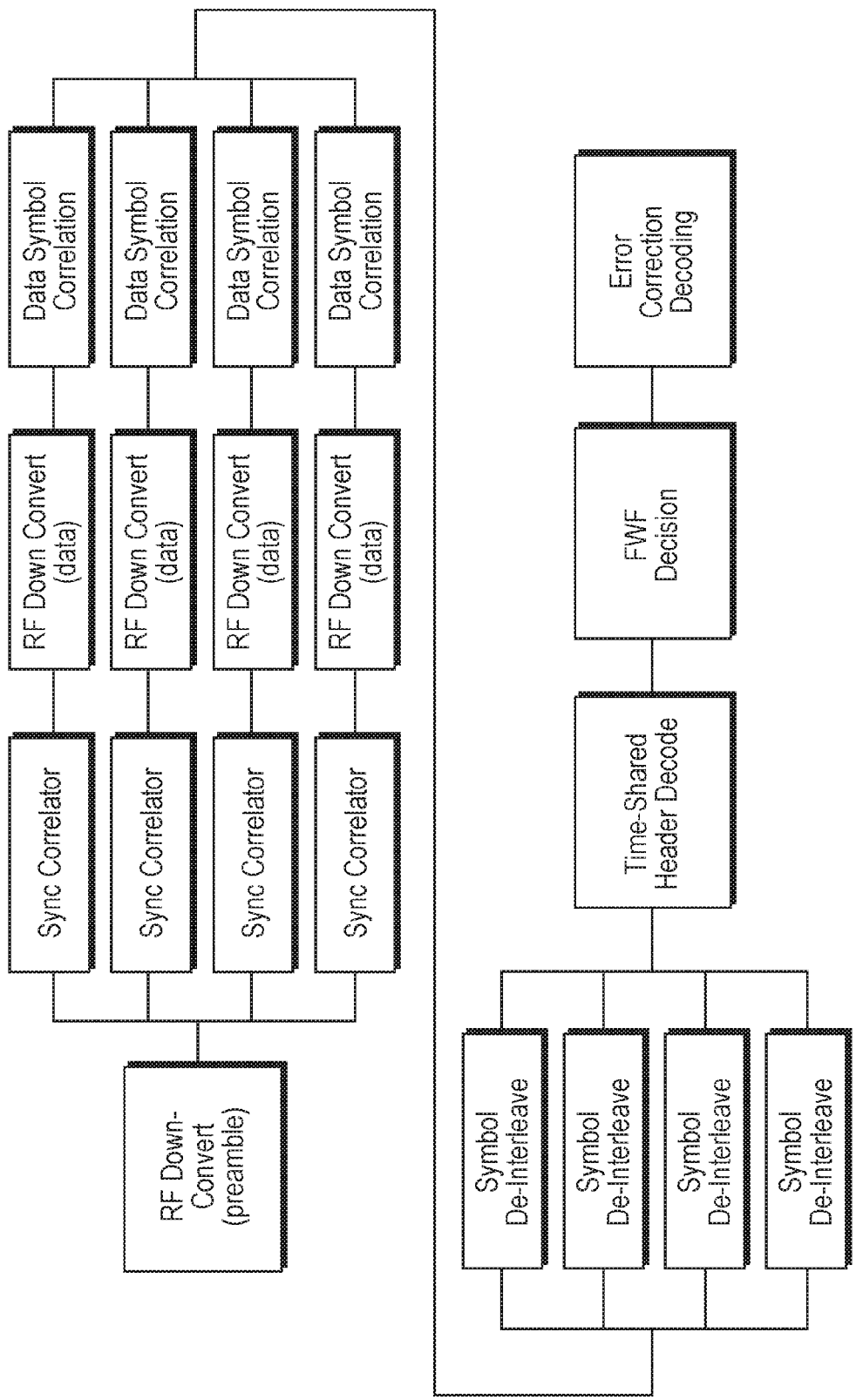
FIG. 3 shows one embodiment of a receive chain with updates necessary for utilizing the frequency waterfilling (FWF) of the present disclosure.

Referring to FIG. 3, one embodiment of a receive chain for performing frequency waterfilling (FWF) of the present disclosure is shown with the necessary updates to Link 16. In certain embodiments, on the receive side the digital downconverter dedicated to tuning to the center frequency of the comms hop is not affected as the hop pattern remains the same. There, the receiver correlates to the sync pulse with four pipelines for the four possible FWF schemes to four data symbol correlators. Then, the data goes through four symbol de-interleavers and one time-shared header decoder, which allows the receiving node to determine which FWF scheme was used for the current message. In certain embodiments, after the FWF scheme is determined the message goes through error correction decoding.

In certain embodiments when the Link 16 terminals do not sense the same interference, or multiple Link 16 nodes request differing FWF schemes, control logic is in place at the receiving node for a Link 16 terminal to determine which FWF request to honor. In certain embodiments, each terminal keeps track of how many nodes the implicit FWF request was received from, as well as the corresponding Signal to Interference & Noise Ratio ("SINR") values associated with each. In certain embodiments, terminals also determine which FWF scheme would be selected locally given jammer center frequency and bandwidth estimates from an interference recognizer. If multiple FWF schemes are requested, the receiving Link 16 node either responds with the scheme that is the majority, or, if there is not a majority, the receiving Link 16 node services the FWF request from the node with the lowest recorded SINR. In certain embodiments, the local FWF selection has an artificially high SINR to allow for any received FWF request to take precedence. In certain embodiments, information such as Node ID and preamble detection peak (SNR) can be shared between nodes in the Link 16 network via the Precise Participant. Location and Identification ("PPLI") message. This local FWF selection and received FWF request data may then be stored in a table and decision logic can be conducted in the Link 16 firmware.

Figure 4:
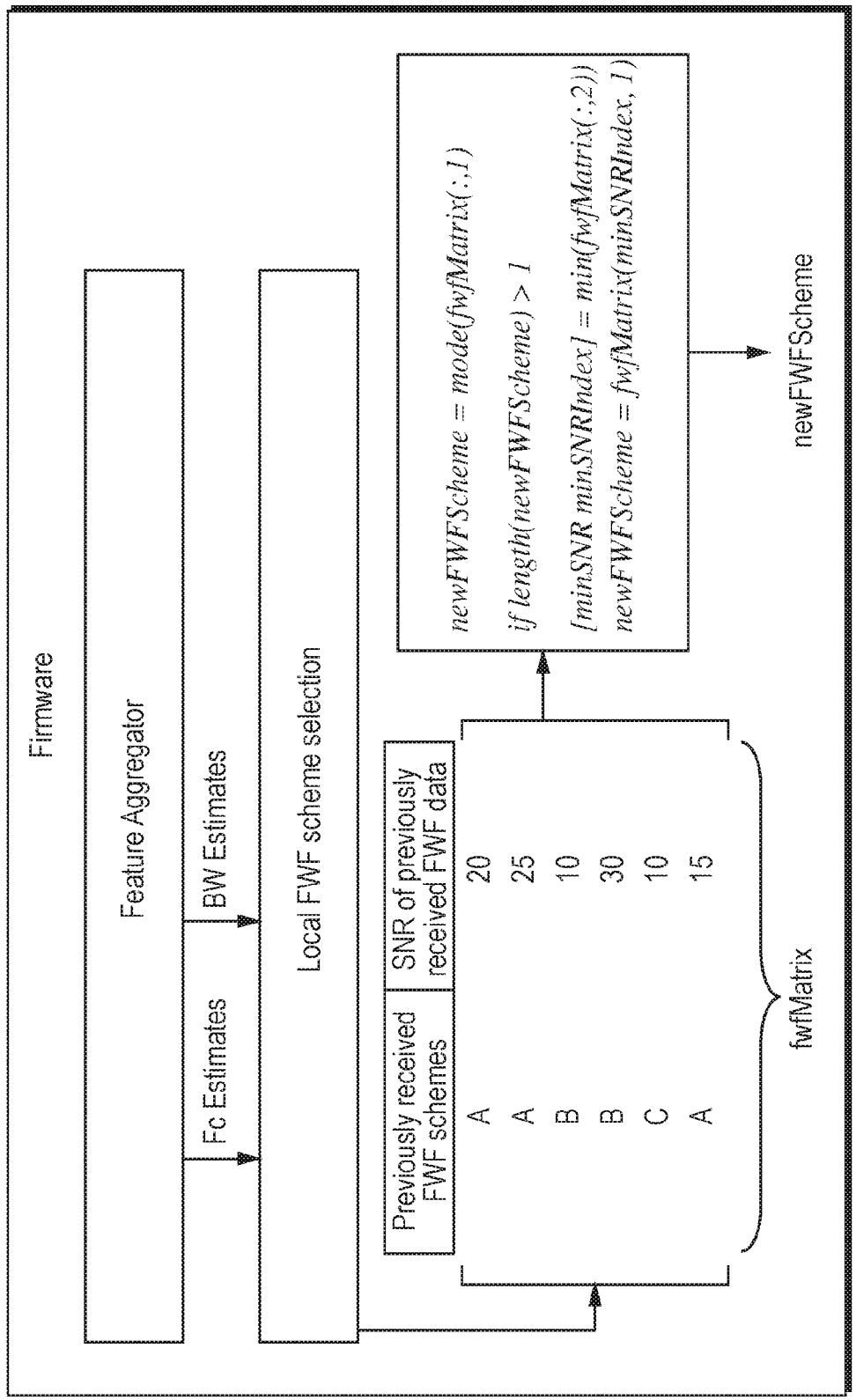
FIG. 4 shows one embodiment of the present disclosure with conflict resolution logic for selection of a frequency waterfilling (FWF) scheme in a network where multiple competing requests may be received.

Referring to FIG. 4, one embodiment of conflict resolution logic for frequency waterfilling (FWF) scheme selection of the present disclosure is shown. Mare specifically, the process a node goes through to determine which FWF scheme to use upon transmission is depicted in the figure. To support this conflict resolution logic, the component receives as inputs the locally detected interference parameters (center Frequency, Fc, and Bandwidth, BW) along with a table of recently received messages that contains (for each): the detected FWF scheme, and an estimate of the message's SNR determined from. Its Synchronization score. With these inputs the logic first looks to see if there is a conflict, if no conflict exists (all requests and local information relate to the same scheme), it will use the local FWF scheme. If there is a conflict, the logic first looks to see if a majority of recent, requests are for a particular scheme. If that is the case, it will use that scheme. In the case where there is not a dominantly requested scheme (i.e. there is no 'mode'), the scheme that relates to the message received at the lowest SNR will be selected. The reason for this is because if we can't satisfy everyone, we satisfy the request that is the most, likely to be negatively impacted if we do not use that node's requested FWF scheme. In certain embodiments, a timeout approach is implemented for FWF in the case that the interference condition changes and none of the nodes in the network require FWF any longer. In one embodiment, when external control logic turns ON FWF, the FWF enabled message is transmitted with a bit set to 1, indicating that this message is an FWF request and that the requesting node would like other nodes to respond with the same FWF scheme accordingly. In one embodiment, if a node receives an FWF message that is a request, this request will be added to a FWF request table and the majority request will be honored by transmitting with the corresponding majority FWF scheme. When an FWF message is sent as a response, the same request bit will be set to 0 to indicate that this is not a new request, but a response to a previous request. In certain embodiments, if an interferer is no longer present, then a strategy optimizer will turn OFF FWF and all messages sent with FWF applied will be responses to older requests without any new requests, in certain embodiments, if a node is responding to a request but has not received a new request for 8 receive slots, then eventually the node will clear its FWF request table and will return to transmitting messages regularly without FWF applied.

Figure 5:
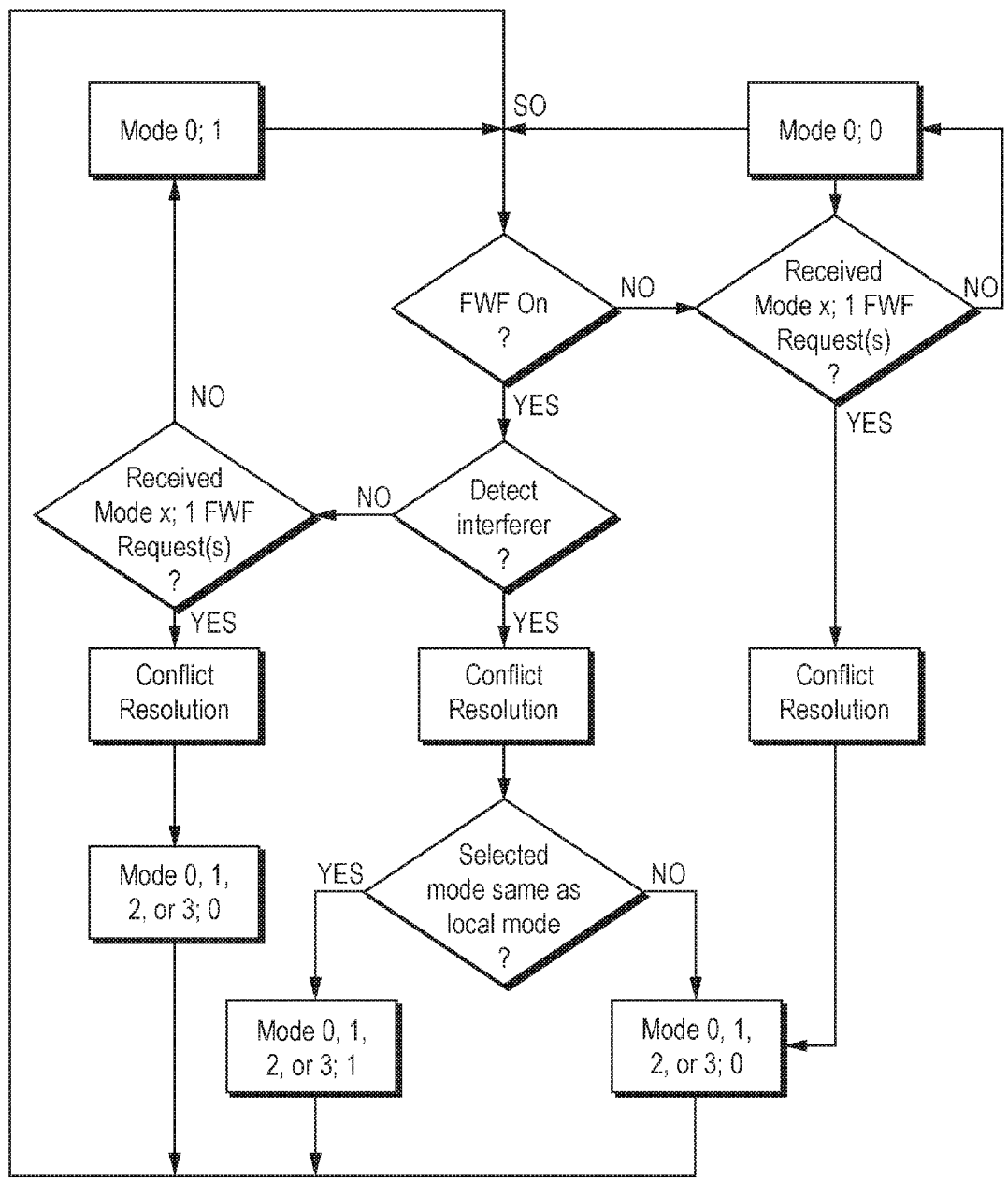
FIG. 5 shows one embodiment of frequency waterfilling (FWF) timeout logic (mode; request) of the present disclosure.

Referring to FIG. 5, one embodiment of frequency waterfilling (FWF) Timeout Logic (mode; request) of the present disclosure is shown, where SO denotes a Strategy Optimizer. More specifically, the flow chart indicates mode X; Y, where X is 0, 1, 2, or 3 meaning an FWF request to avoid no band, band1, band2, or band3 and Y is 0 or 1 meaning what was received is a response to a request (0) or is a request (1).

In certain embodiments, if the local decision logic has not turned FWF ON, then the local node checks if any FWF requests have been received. If no requests have been received, then FWF remains OFF. If at least one request has come in, then conflict resolution is performed (if necessary) among multiple requests to decide which request to honor.

In certain embodiments, if the local decision logic has turned FWF ON, then the local node checks for detection of an interferer. If an interferer is detected, then the mode that the local node would select is added to the table of collected requests and conflict resolution Is performed to decide which request to honor. If the honored request is the same as the local node decision, then the FWF mode is sent with a T indicating this is also a request from the local node. Otherwise, the local node sends the FWF mode with a indicating this is only a response to other requests.

In certain embodiments, if FWF is ON, but an interferer is no longer detected at the local node, the local node will check to determine whether any new requests have come in. If no interferer is detected and no new requests will come in after a fixed timeout period, then the local node will send out mode 0 (or FWF OFF), with a '1' indicating that this is a request to other nodes to turn off FWF as it is no longer required.

In certain embodiments, based on information from an interference recognizer ("IR") a strategy optimizer makes the decision to either enable or disable FWF. The IR is a component that performs interference detection and characterization. FWF as a stand-alone entity requires interference center frequency and bandwidth as inputs. The IR is a component that provides these inputs in one instantiation. Other instantiations could receive these inputs from predefined sources, or other sources of interference information. In certain embodiments, the decision about which FWF scheme to use is part of the control logic. In certain embodiments, this information is forwarded to the FPGA FW. In one embodiment, these FWF configuration parameters are assumed to be modified no more than once per slot and will be retained for all future slots if they are updated at a slower rate, in one embodiment, all other information flow between the FW and SW is identical to normal Link 16 processing.

In certain embodiments, the decision logic to select which FWF scheme to transmit with will occur in the control logic in the Link 16 firmware. In one embodiment, this requires information from an Interference Recognizer ("IR"). In certain embodiments, the information may include a jammer's center frequency and bandwidth estimates. In certain embodiments, the information may also include a stored matrix of selected FWF schemes from other Link 16 terminals that will be updated each time a transmission is received with FWF tamed ON. In certain embodiments, when a strategy optimizer selects FWF as a mitigation technique, the logic in the firmware will evaluate the local FWF selection and all other received FWF requests for some fixed duration in history to select the preferred FWF scheme to transmit. In certain embodiments, the local FWF selection will be evaluated based on local jammer center frequency and bandwidth estimates. One embodiment of the FWF logic used is illustrated in FIG. 4. In certain embodiments, the local FWF scheme will be assigned an artificially high SINR value which will guarantee that any other FWF request received will, have priority.

In certain embodiments, the FWF controls are defined as in Table 1 showing, for example, CommEx Command Registers. These registers were written upon initialization or strategy change and were not time critical. In certain embodiments, a reset set all register values to 0. Values were sampled onto FPGA internal discretes at the end of every slot FWFOn was an internal FPGA discrete that was passed from the CPU interface to the other major sub-functions within the FPGA that need to be modified to implement FWF (see, for example, FIG. 5).

TABLE 1

CommEx Command Registers for FWF

| LD:Word # | Bit Positions | Contents | # Bits | R/W |
|---|---|---|---|---|
| 109:0 | 0, 2-32 | Reserved for other mitigation techniques | 1 | W |
| 109:0 | 1 | FWFOn, 0 = FWF off, 1 = FWF on | 1 | W |

In certain embodiments of the FWF system described herein, updates to the Link 16 core logic in the FPGA may be made. In certain embodiments, the FWFOn discrete may be added to the CPU interface and distributed to relevant blocks within the FPGA. In certain embodiments, the baseline transmit top level may be modified. In certain embodiments the modification may include setting the number of transmit pulses to extended when FWF is enabled and transmitting a normal length message. In certain embodiments, the modification may include setting the number of transmit pulses to the new modified length when FWF is enabled and transmitting an RTT message. In certain embodiments, the modification may include replacing hops on avoided sub-bands with "dummy" data.

In certain embodiments of the FWF system described herein, the receive chain may be modified. In certain embodiments, the modification may include outputting four pipelines from the sync correlator. In certain embodiments, the modification may include adjusting sync thresholds for each pipeline based on number of expected frequencies. In certain embodiments, the modification may include adding four parallel peak detectors, TOA calculators, and/or peak arbitration logic. In certain embodiments, the modification may include adding four parallel data decoders, four de- interleavers, and/or mixing logic for routing FWF winner data to single error correction decoding.

Additional updates to the Link 16 core logic in certain embodiments of the disclosure may include modifying the message controller sequence to add decoding of the three possible FWF RTTs if the normal RTT header fails. In certain embodiments, an update may include decoding three possible FWF headers if the normal message header fails and to declare a FWF winner if one of the FWF RTT or normal header decodes passes. In certain embodiments, a block is added to determine correlator zeroes. In certain embodiments, valid sequences are pulsed for all FWF modes using a re-mapped frequency table. In certain embodiments, the transmit symbol logic may be modified to allow a bit to be set. In Link 16 Enhanced Throughput ("LET") ID symbol indicating an FWF request was sent. In certain embodiments, the receive symbol logic may be modified to decode the added bit in the LET ID symbol indicating FWF request was sent without interpreting this as a message received in error.

In certain embodiments, the system is configured to transmit/receive various normal length messages in one of the five possible modes (FWF OFF, FWF ON with no sub-bands excluded, FWF ON with each of three sob-bands excluded). An analysis of the impact of FWF on the successful reception of the required 218 pulses was completed in Matlab. By simulating Monte Carlo trials of the Link 16 logic for selecting which hop frequencies to transmit on, and choosing one third of the band to send "dummy" data on as FWF would do, it has been determined that activating FWF would not have a negative impact on the successful reception of messages given other terminals can receive a message using FWF as well. The performance gains that FWF can achieve over Link 16 have also been characterized on hardware in two node laboratory tests.

Instead of explicit coordination approaches, where a node that desires to receive messages without using an affected spectrum region would need to send information to other nodes via messaging within the data protocol, the FWF system of the present disclosure uses implicit coordination. In this way, a node that cannot receive messages because of an affected spectrum region may send outgoing transmissions using the waterfilling condition they would like others to use. Other nodes have additional receiver functions that instead of trying to receive a message only in a standard way, may also decode the message according to the other possible ways the messages could have been encoded using waterfilling. In this way, the nodes can determine if other nodes are using a specified waterfilling scheme and then reply in kind, so the original affected node could again receive communications. This methodology also removes any need for higher layer handshaking to confirm the coordination.

The FWF system described herein is an important improvement over existing solutions for a number of reasons. One reason is that the present system does not require a 'low-rate' information link to get the coordination message out, making it especially useful in waveforms that have frequency agility but do not have many data rate modes. A second reason is that the present system does not require higher-layer handshaking. The system is a low-latency approach that can be utilized quickly when necessary, and easily de-activated when no longer necessary.

Other potential uses for the FWF system described herein include instances when a waveform requires the coordination of small bits of data (or waveform changes) without explicitly sending a coordination message, whether it is because of a desire to prevent coordination messages from being captured, or whether there is no other mechanism for performing the coordination.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special, purpose logic circuitry, e.g., an PPGA (field programmable gate array) or an ASIC (application-specific integrated circuit).

Processors suitable for the execution of a computer program include, by way of example, special purpose microprocessors and any one or more processors of any kind of digital computer. Generally, a processor will receive instructions and data from a read-only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., BPROM, EEPRGM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry or the like.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of mitigating signal jamming in a Link 16 communication system, comprising
   identifying a plurality of transmitting nodes configured to transmit on a Link 16 band;
   identifying a plurality of receiving nodes;
   transmitting messages from a first node to a second node on a Link 16 band and processing the messages at the second node;
   detecting jamming energy and making a determination to activate a selected Frequency Waterfilling (FWF) scheme;
   transmitting encoded messages at the second node using the selected FWF scheme;
   receiving the encoded messages at the first node;
   determining the selected FWF scheme and decoding the encoded messages at the first node; and
   communicating further messages between the first node and the second node using the selected FWF scheme.

2. The method of claim 1, wherein the encoded messages comprise a plurality of FWF schemes and the selected FWF scheme is determined by quantifying a number of requests for each of FWF scheme detected.

3. The method of claim 1, wherein the selected FWF scheme is determined by assessing a signal to noise ratio of the transmitted messages.

4. The method of claim 1, further comprising error correction decoding of the encoded messages.

5. The method of claim 1, wherein the encoded messages comprise a plurality of FWF schemes and further comprising correlating sync pulses with pipelines for the plurality of FWF schemes.

6. The method of claim 1, further comprising de-interleaving the encoded messages.

7. The method of claim 1, wherein determining the selected FWF scheme is based on proper alignment of data after interleaving.

8. The method of claim 1, wherein transmitting using the selected FWF scheme comprises transmitting "dummy" pulses on hops that are within a sub-band that is to be avoided.

9. The method of claim 1, switching to a new selected FWF scheme.

10. The method of claim 1, deactivating the selected FWF scheme.

11. The system of claim 10, further comprising a time out logic module.

12. The system of claim 10, further comprising a conflict resolution module.

13. The method of claim 1, wherein the Link 16 band comprises three segments of contiguous frequencies.

14. The method of claim 1, wherein there are four FWF schemes.

15. A non-transitory computer-readable medium tangibly embodying a computer program comprising instructions operable to cause data processing apparatus to perform operations comprising:
- identifying a plurality of transmitting nodes configured to transmit on a Link 16 band divided into three equal sub-bands, thus transmitting signals via four possible FWF schemes;
- identifying a plurality of receiving nodes;
- detecting jamming energy;
- decoding signals from a first transmitting node at a first receiving node to determine the amount of data in a signal that overlaps with jamming energy;
- determining at the first receiving node whether a Frequency Waterfilling (FWF) scheme request is being transmitted by the first transmitting node;
- selecting at the first receiving node the FWF scheme requested from the first transmitting node; and
- transmitting a signal at a second transmitting node using the selected FWF scheme requested by the first transmitting node.

16. An anti-jamming system for Link 16 utilizing frequency waterfilling comprising,
- a plurality of transmitters configured to transmit signals using four possible Frequency Waterfilling (FWF) schemes, wherein the transmitter comprises a modified data spreader to allocate bits to hop periods;
- a plurality of receivers comprising control logic and modified combination matrix, peak detector, data recorder, and message control modules;
- an interference recognizer module;
- a Frequency Water filling (FWF) pulse selection module; and
- an interface between the receivers and transmitters comprising modified message control and frequency re-mapping modules.

17. A method of communicating in a Link 16 communication system, comprising:
- transmitting messages from a first node to a second node on a Link 16 band;
- receiving the messages on the second node and determining whether to activate frequency waterfilling (FWF) schemes;
- if it is determined to active the FWF schemes;
  - encoding messages at the second node using a selected FWF scheme;
  - transmitting the encoded messages from the second node;
  - receiving the encoded messages at the first node and determining the selected FWF scheme;
  - decoding the encoded messages; and
  - communicating further messages between the first node and the second node using the selected FWF scheme.

* * * * *